United States Patent
Fair

(10) Patent No.: US 7,549,014 B1
(45) Date of Patent: Jun. 16, 2009

(54) METHOD AND APPARATUS FOR COALESCED MULTI-BLOCK READ

(75) Inventor: Robert L. Fair, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 419 days.

(21) Appl. No.: 11/112,409

(22) Filed: Apr. 22, 2005

(51) Int. Cl.
*G06F 12/00* (2006.01)

(52) U.S. Cl. ...................................... 711/112
(58) Field of Classification Search .................. 711/112
See application file for complete search history.

(56) References Cited

U.S. PATENT DOCUMENTS

| | | | | |
|---|---|---|---|---|
| 5,483,641 A | | 1/1996 | Jones et al. | |
| 5,758,075 A | * | 5/1998 | Graziano et al. | 709/250 |
| 5,761,657 A | * | 6/1998 | Hoang | 707/4 |
| 6,912,643 B2 | * | 6/2005 | Horn | 711/202 |
| 2004/0260673 A1 | * | 12/2004 | Hitz et al. | 707/1 |
| 2005/0021879 A1 | * | 1/2005 | Douglas | 710/5 |
| 2005/0166012 A1 | * | 7/2005 | Liu et al. | 711/112 |

* cited by examiner

*Primary Examiner*—Reginald G Bragdon
*Assistant Examiner*—Aracelis Ruiz
(74) *Attorney, Agent, or Firm*—Blakely, Sokoloff, Taylor & Zafman LLP

(57) ABSTRACT

A storage system, such as a storage server, receives a list of volume block numbers (VBNs) in a multi-block read request. In response to the request, the storage system coalesces the list into one or more chains of sequential VBNs. The storage system issues each chain to the storage subsystem.

13 Claims, 11 Drawing Sheets

FIG. 11

| Row | List of vbns | Chains of VBNs | Message(s) Issued to Storage Subsystem |
|---|---|---|---|
| A | 1, 2, 3, 4, 5 | 1-5 | read VBNs 1-5 |
| B | 1, 100, 3, 102, 5, 103, 6 | 1-6 | read VBNs 1-6 |
|  |  | 100-103 | read VBNs 100-103 |
| C | 1, 100, 50, 51, 52, 103, 2, 105, 4 | 1-4 | read VBNs 1-4 |
|  |  | 100-105 | read VBNs 100-105 |
|  |  | 50-52 | read VBNs 50-52 |
| D | 1, 100, 3, 1000, 5, 700 | 1-5 | read VBNs 1-5 |
|  |  | 100 | read VBN 100 |
|  |  | 10000 | read VBN 1000 |
|  |  | 700 | read VBN 700 |
| E | 1, 4, 5, 700, 701, 703, 706, 707, 708, 709 | 1-5 | read VBNs 1-5 |
|  |  | 700-709 | read VBNs 700-709 |

METHOD AND APPARATUS FOR COALESCED MULTI-BLOCK READ

FIELD OF THE INVENTION

At least one embodiment of the present invention pertains to storage systems, and more particularly, to a method and apparatus for performing multi-block reads of data.

BACKGROUND

A storage server is a special-purpose processing system used to store and retrieve data on behalf of one or more client processing systems ("clients"). A storage server can be used for many different purposes, such as to provide multiple users with access to shared data or to backup mission critical data.

A storage server includes a storage operating system that logically organizes sets of data blocks stored on mass storage devices, such as magnetic or optical storage based disks or tapes. The mass storage devices may be organized into one or more volumes of Redundant Array of Inexpensive Disks (RAID). In a block-based deployment, such as a conventional storage area network (SAN), client requests can directly address specific data blocks in the storage server, thus providing block-level access. In a file-based deployment, such as a network attached storage (NAS) environment, the operating system implements a file system to logically organize the data blocks as a hierarchical structure of addressable files and directories on the disks, thus providing file-level access.

A file system assigns each file a sequence of consecutively numbered file block number (FBNs), which are associated with volume block numbers (VBNs). The volume block numbers (VBNs), which may or may not be consecutively numbered, typically have a one-to-one mapping to on-disk data blocks, which are assigned disk block numbers (DBNs).

A read stream is defined as a set of one or more client requests that instructs the storage server to retrieve data from a logically contiguous range of FBNs within a requested file. Accordingly, a read stream may be construed by the file system as a sequence of client requests that directs the file system to retrieve a sequence of data blocks assigned to consecutively numbered FBNs. Client requests in the read stream may employ file-based or block-based semantics, so long as they instruct the storage server to retrieve data from the stream's logically contiguous range of FBNs.

When a request in a read stream is received by a storage server, the request may direct the storage server to retrieve a list of data blocks (i.e. VBNs) assigned to consecutive numbered FBNs. However, as suggested above, although the FBNs may be consecutive, the list of VBNs may or may not be consecutive (or sequential). When a new file or logical unit number (LUN) (i.e. the address assigned to each storage device in a block-based server) is written, the VBNs are typically adjacent on disk, and therefore, the list of VBNs is sequential, e.g. VBN 1, 2, 3, 4, 5. When the list is sequential, the file system in the storage server can satisfy the request by issuing one (or a few) commands that cover ranges of VBNs. For example, when the request is to read VBN 1, 2, 3, 4, 5, the file system can issue a command to a storage subsystem to read VBN 1-5, rather than issuing five separate commands (e.g. read VBN 1, read VBN 2, read VBN 3, read VBN 4, read VBN 5).

However, when the list is non-sequential, the file system conventionally satisfies the request by issuing several small commands. For example, when the request is to read VBN, 1, 100, 3, 101, 5, the file system conventionally issues five separate messages to a storage subsystem: read VBN 1, read VBN 100, read VBN 3, read VBN 10, and read VBN 5. Issuing these small multiple read commands reduces the performance of the storage server.

Conventional solutions to improve performance attempt to prevent the data block (i.e. VBNs) list from containing non-sequential VBNs. For example, one solution attempts to defragment a disk so that data blocks associated with a single file are sequential again. However, defragmenting a disk is often time-consuming and may prevent access to the disk for a prohibitive length of time. Defragmentation also fails to provide real-time improvements in system performance since it is often scheduled to occur at a certain time or after a disk has reached a certain amount of fragmentation.

Another conventional solution attempts to prevent the data block (i.e. VBNs) list from containing non-sequential VBNs by writing modified data blocks to the same VBNs, rather than to a different location. However, file systems implementing this solution may have a larger write operation overhead than file systems that allow modified data blocks to be written to different locations, e.g. the write-out-of-place design. For example, when operated with a RAID array, the write-out-of-place design schedules multiple writes to the same RAID stripe whenever possible. This scheduling reduces write operation overhead by avoiding updating only one block in a stripe when possible. This reduction in write operation overhead is lost when a file system writes to the same VBNs to avoid fragmenting a file or LUN.

Therefore, what is needed is a technique for improving multi-block reads that overcomes the shortcomings of the above-mentioned approaches.

SUMMARY OF THE INVENTION

The present invention includes a method for reading multiple data blocks which includes, coalescing volume block numbers in a list of non-sequential volume block numbers into one or more chains of sequential volume block numbers. The method further includes transmitting each chain asynchronously to a mass storage subsystem for processing.

The invention further includes a system and apparatus that can perform such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 11 shows a table of various chains that may be created from a VBNs list and messages that may be issued to a storage subsystem in accordance with embodiments of this invention.

DETAILED DESCRIPTION

Figure 1:
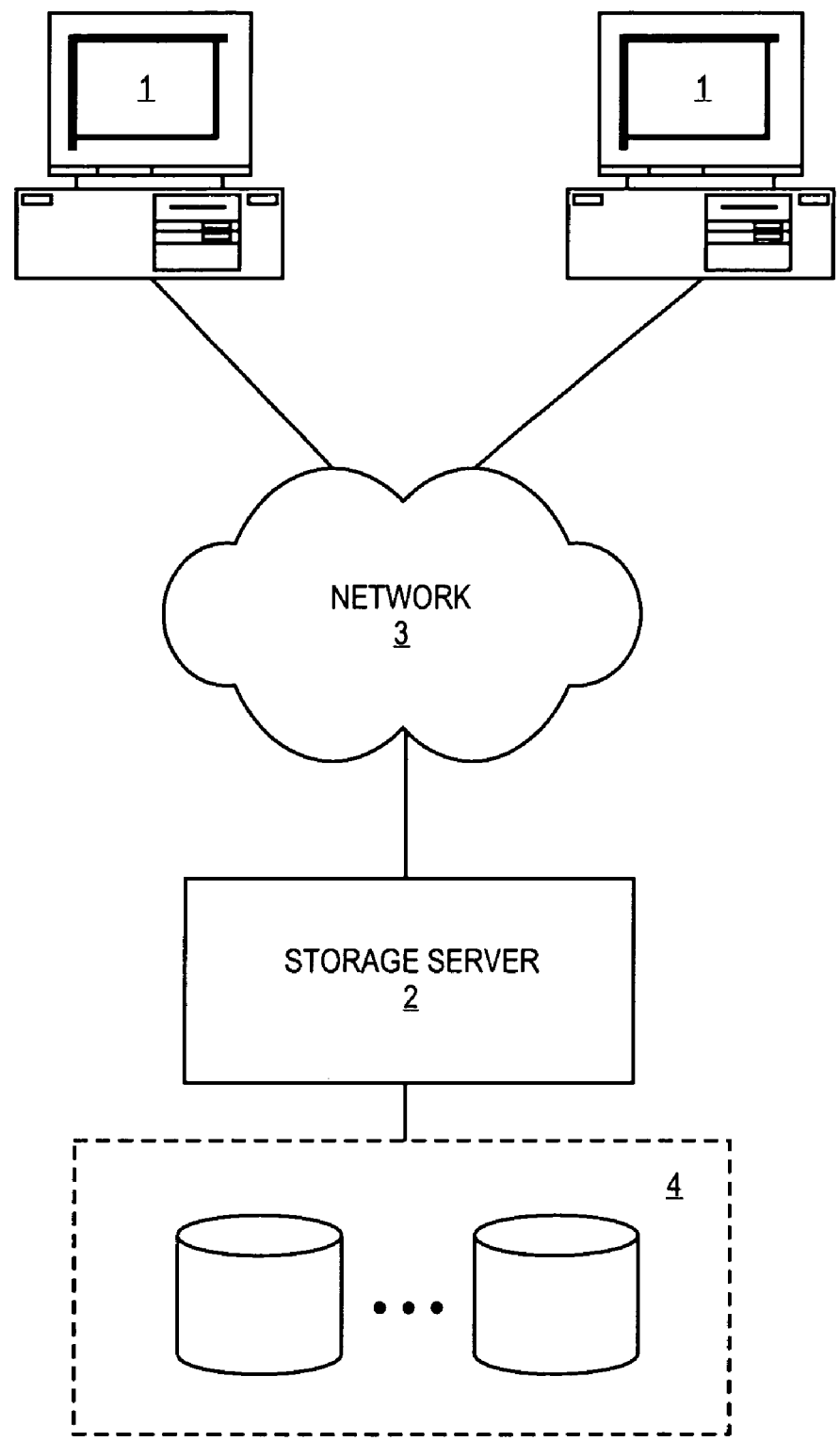
FIG. 1 shows a network environment that includes a storage server which implements the invention.

A method and apparatus for reading multiple data blocks are described. As described in greater detail below, in certain embodiments of the invention, the method includes analyzing a list of volume block numbers (VBNs) in a multi-block read request, coalescing VBNs in the list into one or more chains of sequential VBNs, and issuing each chain to a storage subsystem. As used herein, a chain of sequential VBNs refers to an ordered list of VBNs. In certain embodiments, a chain of sequential VBNs may be expressed as a range of VBNs, e.g. VBNs 1-5 or VBNs 100-101.

As used herein, reference to coalescing volume block numbers in a list refers to grouping and/or reordering VBNs in the list according to one or more criteria. The one or more criteria will be evident from the examples and details below and may include, but is not limited to, sequential order and numerical range. For example, for a list of VBN 1, 2, 100, 101, 6, 7, 200, if the criterion is sequential order, coalescing may group VBN 1, 2 together, VBN 100, 101 together and VBN 6, 7 together. If the criterion also includes a numerical range of five VBN, for example, then coalescing may group VBN 1, 2, 6, 7 together and VBN 100, 101 together.

By coalescing the list of non-sequential VBNs, the number of read commands (or message) issued to the storage subsystem is reduced. For example, for a list such as VBNs 1, 100, 3, 101, 5, rather than issuing five short and separate read messages (e.g. read VBN 1, read VBN 100, read VBN 3, read VBN 101, and read VBN 5), two longer read messages may be issued (e.g. read 1-5 and read 100-101). Therefore, two, rather than five, messages may be issued from the file system to a storage access layer (e.g. a RAID layer), from the storage access layer to a storage disk driver layer, and from the storage disk driver layer to hardware (e.g. an array of storage disks). Accordingly, overall system overhead for a read operation may be reduced.

Additionally, embodiments of this invention may be used in conjunction with other optimization techniques. For example, embodiments of this invention may be used in conjunction with techniques which coalesce blocks "lower" in the system, such as in a disk driver or within disk firmware. This is because the embodiments of this invention coalesce the VBNs list in the file system layer (e.g. the Write Anywhere File Layout (WAFL®) file system made by Network Appliance, Inc.). Implementing embodiments of this invention in the file system layer allows the optimization to be independent of any potential lower system optimization and therefore improves system performance more consistently.

Additionally, embodiments of this invention may be used in conjunction with optimization techniques which also occur at the file system level, e.g. readahead operations described in co-pending and co-assigned U.S. patent application Ser. No. 10/721,596 entitled "Adaptive File Readahead Technique For Multiple Read Streams," filed on Nov. 25, 2003, and co-pending and co-assigned U.S. patent application Ser. No. 10/753,608 entitled "Adaptive File Readahead Based on Multiple Factors," filed Jan. 9, 2004. For example, embodiments of this invention can take a range of non-sequential blocks (i.e. VBNs) that should be readahead and coalesce the VBNs into fewer longer chains before issuing the chains to the storage subsystem.

The multi-block read technique introduced herein will now be described in greater detail. The following provides variations and examples of various aspects of embodiments of the invention. It will be appreciated that the following variations and examples are not intended to be exhaustive or to limit the invention to the precise forms disclosed. These variations and examples are to provide further understanding of embodiments of the present invention.

Environments and Architecture

The multi-block read technique introduced herein can be implemented in a storage server or other processing system. For example, this technique may be implemented in a block-based storage server (which provide block-level access) or a file-based storage server (which provide file-level access). This technique may also be implemented in storage servers that provide both file-level access and block-level access.

Block-level access provides access to individual blocks of data. For example, files sent to a file server for storage may be first broken up into 4 kilobyte (kB) blocks. These blocks may be then formed into groups that may be stored in a "stripe" spread across multiple disks in a RAID array. Block-based storage servers provide access to these individual blocks.

In certain embodiments, the block-based storage server may organize its data blocks in the form of databases. In other embodiments, the block-based server may store its blocks internally in a file-oriented structure. Where data is organized as files, a client requesting information maintains its own file mappings and manages file semantics. Meanwhile, the client's requests (and corresponding responses) to the storage server address the requested information in terms of block addresses on disk. In this manner, the storage bus in the block-based storage server may be viewed as being extended to the remote client systems. This "extended bus" is typically embodied as Fibre Channel (FC) or Ethernet media adapted to operate with block-based access protocols, such as the Small Computer Systems Interface (SCSI) protocol encapsulated over FC (FCP) or encapsulated over TCP/IP/Ethernet (iSCSI).

As previously noted, each storage device in the block-based server is typically assigned a unique logical unit number (LUN) by which it can be addressed, e.g., by remote clients. Thus, an "initiator" client system in a block-based deployment may request a data transfer for a particular range of data blocks stored on a "target" LUN. In the case of a client "read" request, the requested range of data blocks is retrieved and then returned to the requesting client. Embodiments of this invention coalesce the list of requested data blocks before issuing the read command (or message) to the storage subsystem.

Embodiments of this invention may also be implemented in file-based storage server. A file server is an example of a file-based storage server. A file server operates on behalf of one or more clients to store and manage shared files in a set of mass storage devices.

When embodiments of this invention are implemented in a file-based storage server, an initiator client system may request one or more files to be accessed without regard to specific locations (e.g. data blocks) in which the requested data are stored on disk. In other words, clients in a file-based deployment employ a semantic level of access to files and file systems stored on the storage server. The file-based storage server converts the received client request from file-system semantics to corresponding ranges of data blocks on the storage disks. For instance, a client may request to retrieve ("read") or store ("write") information in a particular file stored on the storage server. In the case of a client "read" request, data blocks containing the client's requested data are retrieved and the requested data is returned to the client. Embodiments of this invention coalesce the list of data blocks containing the client's requested data.

In general, a file system implemented in a file-based server does not directly access "on-disk" data blocks (e.g. disk block numbers (DBNs) in a disk block number (DBN) address space). Instead, there is typically a one-to-one mapping between data blocks stored on disk (e.g. in a DBN address space) and the same data blocks organized by the file system (e.g. in a volume block number (VBN) space). For instance, N on-disk data blocks may be managed within the file system by assigning each on-disk data block to a unique VBN between zero and N−1, therefore providing a one-to-one mapping between the DBN address space and the VBN space.

The file system may also associate a set of data blocks (i.e. VBNs) with a file or directory managed by the file system. The file system may attribute each data block in the file or directory with a corresponding "file offset" or file block number (FBN). Illustratively, the file offsets in the file or directory may be measured in units of fixed-sized data blocks, e.g. 4 kilobyte (kB) blocks, and therefore can be mapped one-to-one to FBN numbers in that file or directory. Accordingly, each file or directory is defined within the file system as a sequence of data blocks assigned to consecutively numbered FBNs. The file system assigns sequences of FBN numbers on a per-file basis, whereas the file system assigns VBNs over a typically larger volume address space.

Operationally, the storage server typically identifies a read stream based on an ordered sequence of client accesses to the same file. Therefore, as used hereinafter, a file is broadly understood as any set of data in which zero or more read streams can be established. Accordingly, the file may be a traditional file or directory stored on a file-based storage server, since a directory may be implemented as a specially formatted file that stores information about other files and directories.

FIG. 1 shows a simple example of a network environment which incorporates a storage server 2 in accordance with one embodiment of this invention. The storage server 2 may be, for example, a file server, a block-level server, or a combination thereof. The storage server 2 in FIG. 1 is coupled locally to a storage subsystem 4 which includes a set of mass storage devices, and to a set of clients 1 through a network 3, such as a local area network (LAN). Each of the clients 1 may be, for example, a conventional personal computer (PC), workstation, or the like. The storage subsystem 4 is managed by the storage server 2.

The storage server 2 receives and responds to various read and write requests from the clients 1, directed to data stored in or to be stored in the storage subsystem 4. The clients 1 typically communicate with the storage server 2 by exchanging discrete frames or packets of data formatted according to predefined network communication protocols, such as the Transmission Control Protocol/Internet Protocol (TCP/IP). In this context, a protocol consists of a set of rules defining how the interconnected computer systems interact with one another. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

The storage server 2 may have a distributed architecture; for example, it may include a separate N-("network") blade and D-(disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
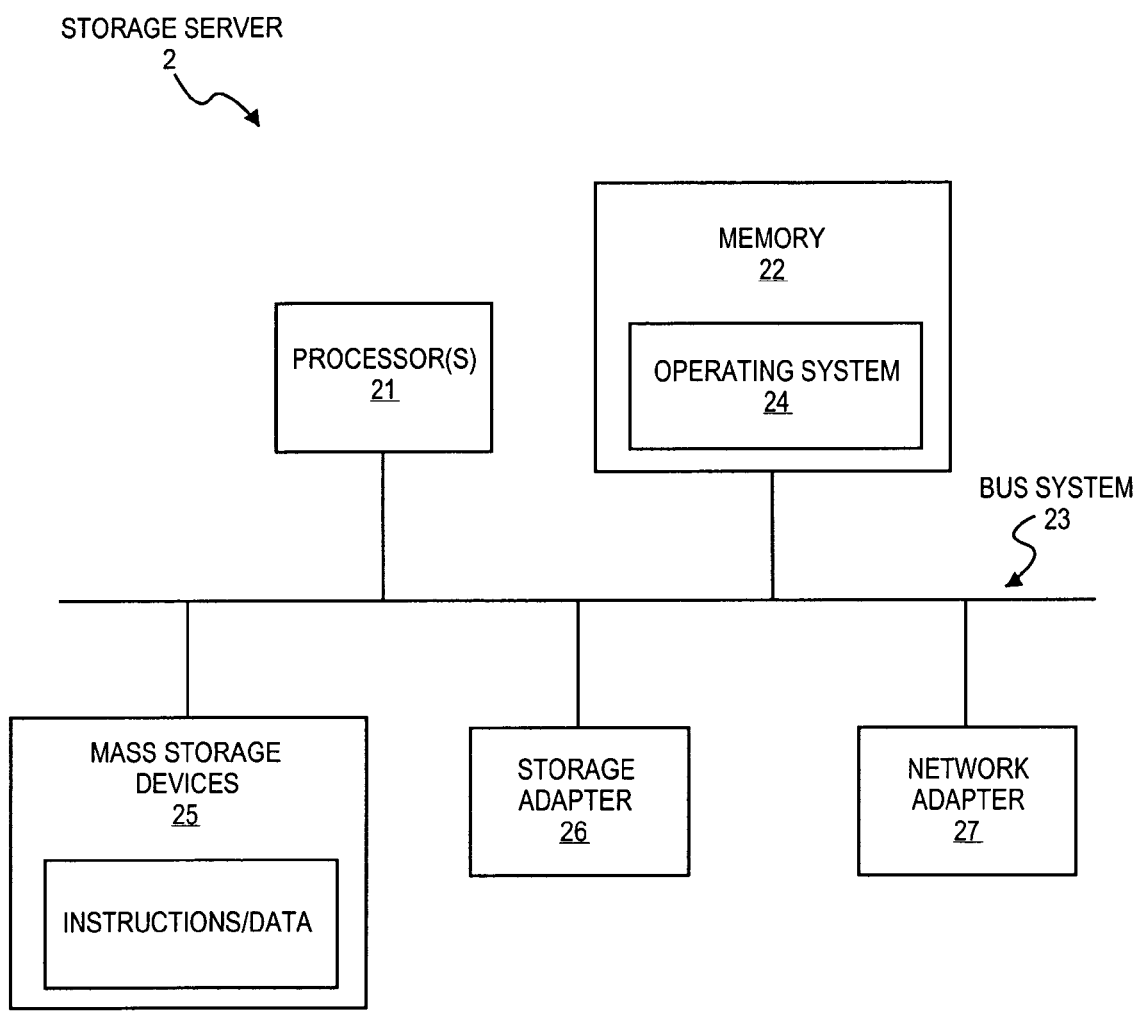
FIG. 2 is a block diagram showing the architecture of a storage server that can implement the invention.

FIG. 2 is a block diagram showing the architecture of the storage server 2, according to certain embodiments of the invention. Certain standard and well-known components which are not germane to the present invention may not be shown. The storage server 2 includes one or more processor(s) 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 21 are the central processing units (CPUs) of the storage server 2 and, thus, control the overall operation of the storage server 2. In certain embodiments, the processor(s) 21 accomplish this by executing software stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 is or includes the main memory of the storage server 2. Memory 22 represents any form of random access memory (RAM), read-only memory (ROM), flash memory, or the like, or a combination of such devices. Memory 22 stores, among other things, the operating system 24 of the storage server 2, in which the multi-block read techniques introduced above can be implemented.

Also connected to the processor(s) 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the storage server 2 to access the storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter.

Figure 3:
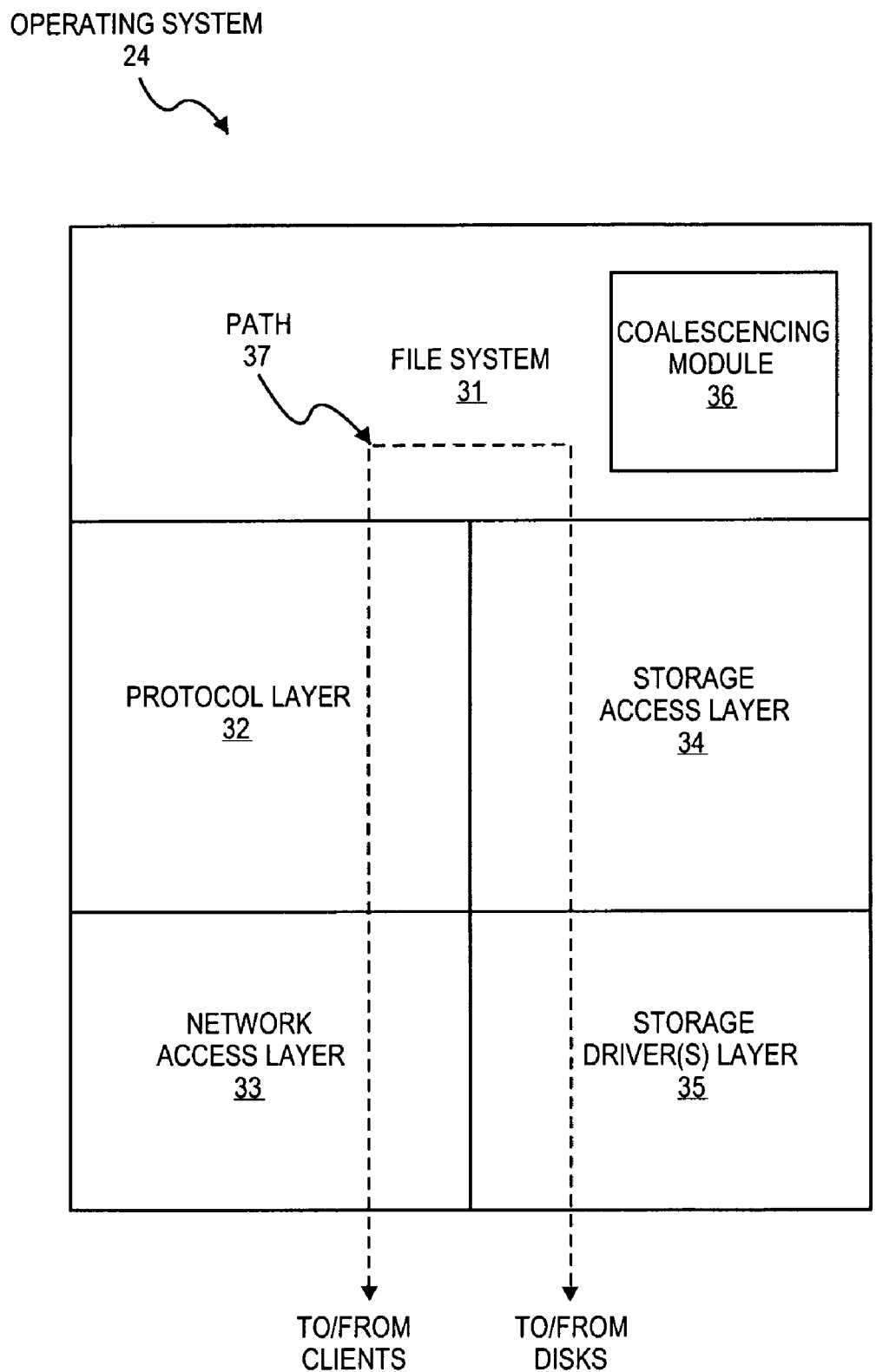
FIG. 3 is a block diagram showing the operating system of a storage server according to one embodiment of the invention.

FIG. 3 shows an example of the operating system 24 of the storage server 2. As shown, the operating system 24 (e.g. the Data ONTAP™ operating system made by Network Appliance, Inc.) includes several modules, or "layers". These layers include a file system 31 (e.g. the WAFL® file system made by Network Appliance, Inc.). The file system 31 is application-layer software that keeps track of the directory structure (hierarchy) of the data stored in the storage subsystem 4 and manages read/write operations on the data (i.e., executes read/write operations on the disks in response to client requests). Coalescing module 36 operates inside the file system 31. The coalescing module 36 performs the coalescing of VBNs lists introduced herein.

Logically "under" the file system 31, the operating system 24 also includes a protocol layer 32 and an associated network access layer 33, to allow the storage server 2 to communicate over the network 3 (e.g. with clients 1). The protocol 32 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 33 includes one or more drivers which implement one or more lower-level protocols to communicate over the network, such as Ethernet or Fibre Channel.

Also logically under the file system 31, the operating system 24 includes a storage access layer 34 and an associated storage driver layer 35, to allow the storage server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI.

Also shown in FIG. 3 is the path 37 of data flow, through the operating system 24, associated with a read or write operation. An example of a data flow associated with a read operation is described in more detail below with reference to FIG. 6.

Process

Figure 4:
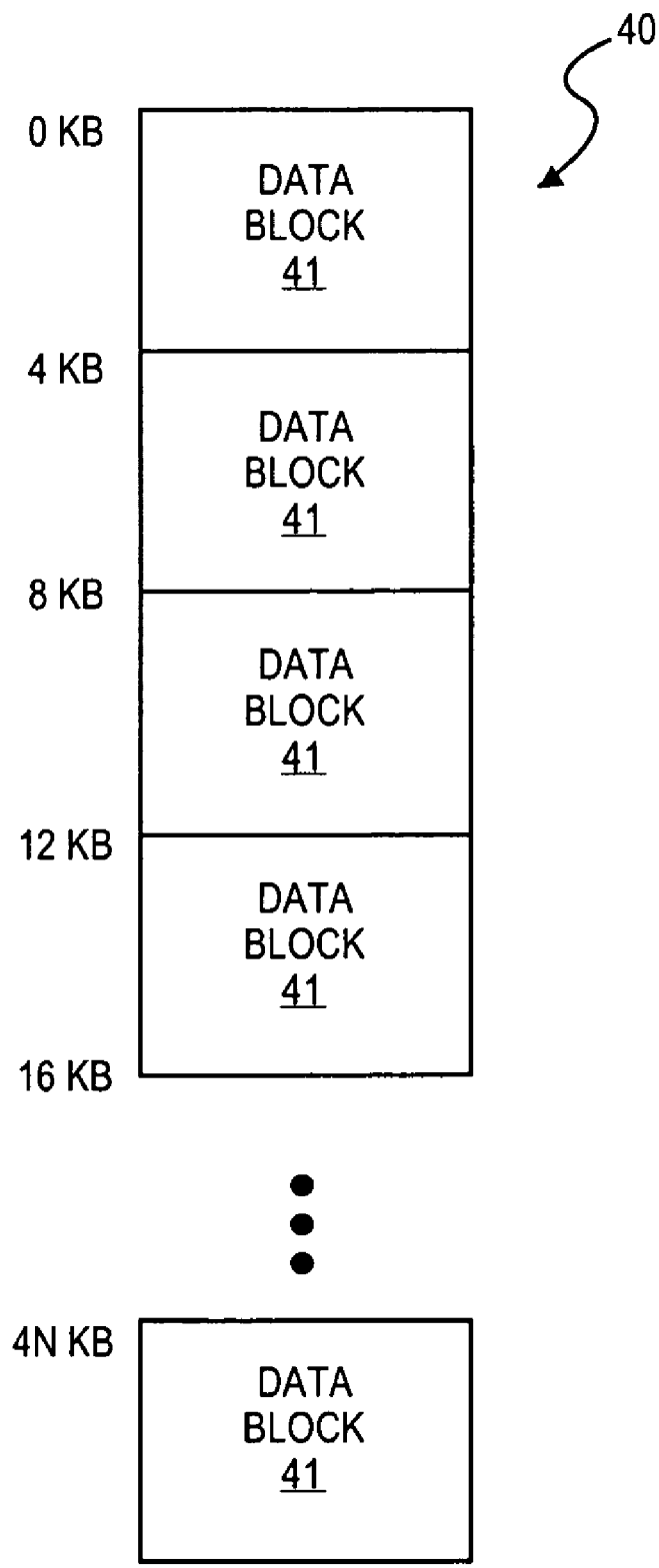
FIG. 4 illustrates how a file is broken up into blocks for storage.

As previously suggested, each file sent to a file server may be broken up into data blocks for storage. The process of placing data into blocks is often called blocking. As used herein, the term "block" can mean any chunk of data which the file system 31 is capable of recognizing and manipulating as a distinct entity. Referring to FIG. 4, a file 40 sent to the storage server 2 for storage may be broken up by the file system 31 into 4 Kbyte blocks 41, which may then be stored in a "stripe" spread across multiple disks in the storage subsystem 4 (e.g. a RAID array), as previously suggested. While in this description a block is described as being a 4 Kbyte chunk, in other embodiments of the invention a block may have a different size. As previously noted, each block is associated with a file block number (FBN), a volume block number (VBN) and a disk block number (DBN). The storage of the blocks of the file 40 in memory may be internally represented by a buffer tree, such as the one shown in FIG. 5.

Figure 5:
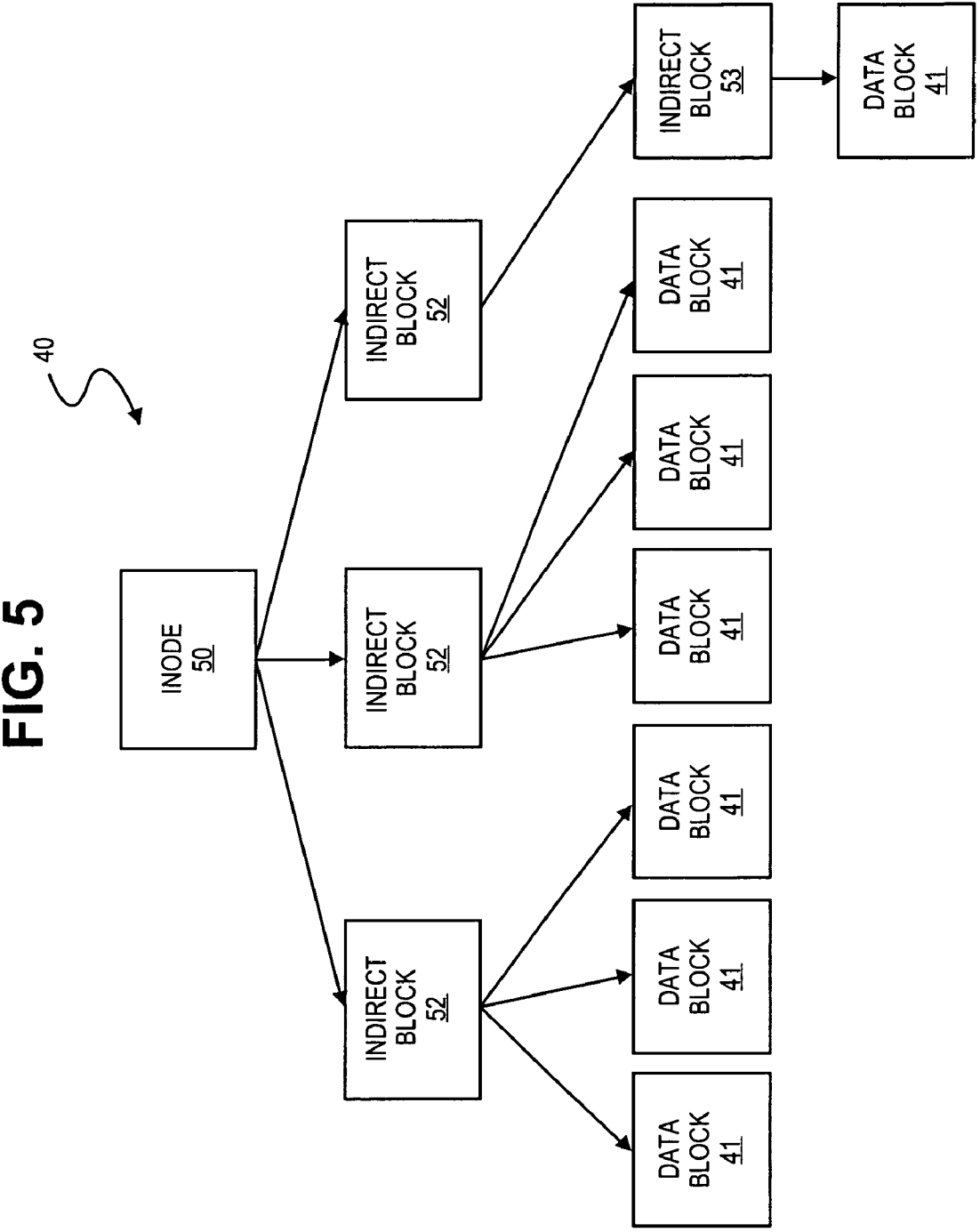
FIG. 5 is a schematic block diagram of a buffer tree that may be associated with a file or directory.

In FIG. 5, the buffer tree comprises a top-level inode 50. An inode is a data structure (stored in an inode file) that includes metadata for the file, such as ownership information, size, file type, and points to the blocks of the file. Normally, each stored file is represented by a corresponding inode.

A data block can be referenced directly by an inode. More commonly, however, a particular data block is referenced by an inode 50 indirectly, rather than directly. For example, for a large file (e.g. greater than 64 kB of data), each pointer in the inode 50 may reference an indirect block 52. An indirect block 52 is a block which points to another block rather than containing actual file data. For example, in FIG. 5, the inode 50 points to an indirect block 52, which points to the actual data block 41 or to another indirect block 53. Each pointer in the indirect block (e.g. indirect block 52 or 53) may store a value identifying a volume block number (VBN) that corresponds to a data block 41. Every data block in a file may be referenced in this way from the inode.

Figure 6:
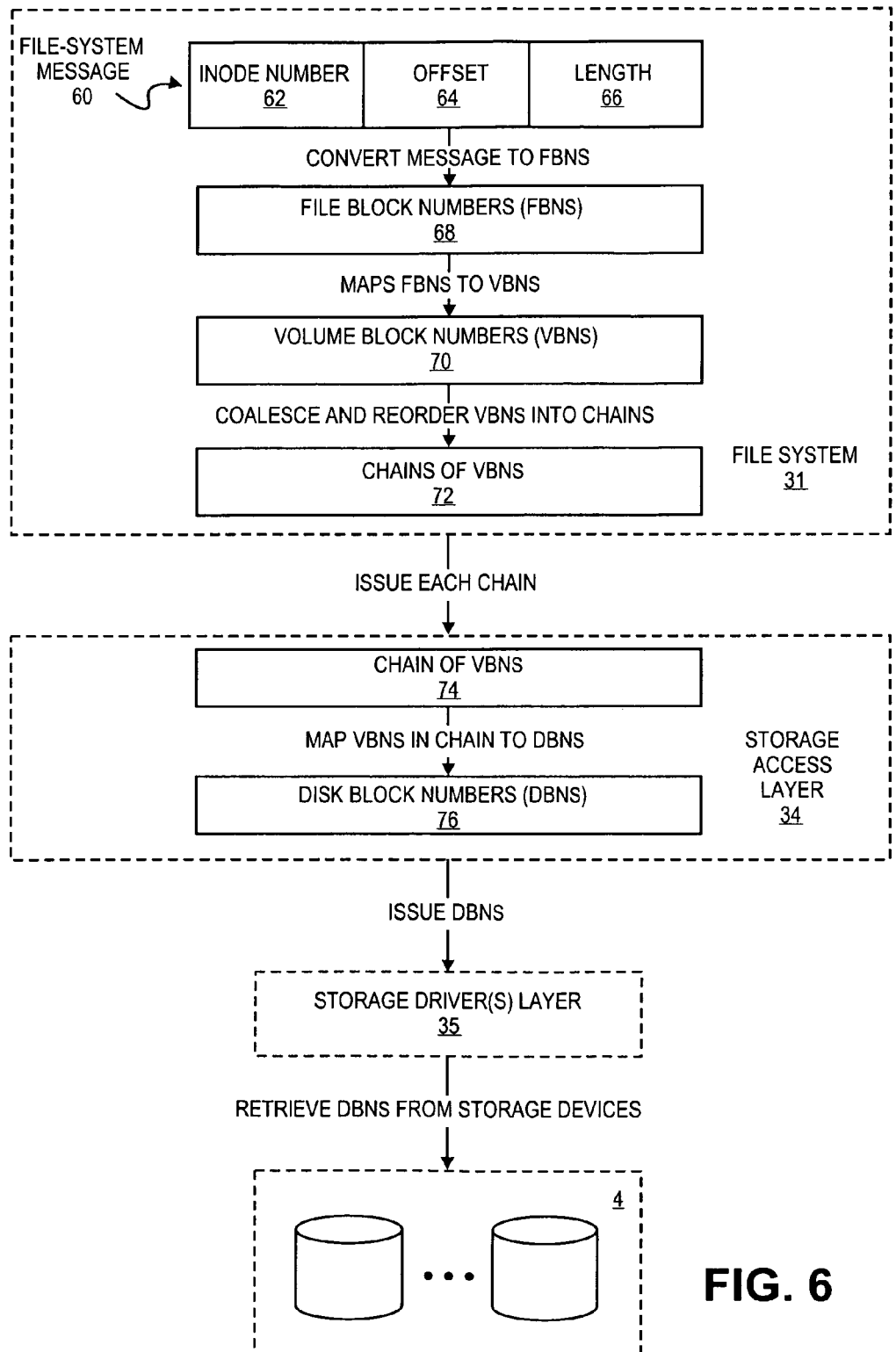
FIG. 6 is a diagram of one technique to determine volume block numbers (VBNs) from a read request in accordance with one embodiment of this invention.

When a file system receives a client request for a file, the request often includes an inode number. Using the inode number, inter alia, the file system may determine a list of data blocks (i.e. VBNs) to retrieve from the storage subsystem. FIG. 6 is a diagram of one technique to determine, from a read request including an inode number, the volume block numbers (VBNs) to retrieve from the lower storage layers in accordance with one embodiment of this invention.

In FIG. 6, file system 31 receives a file-system message 60 which has been processed by various software layers of the integrated network protocol stack. For example, the client read request may have been received at a network adapter 27, processed by a network driver in network layer 33, forwarded to protocol layer 32, and formatted as a file-system message before being passed to the file system 31. The message may specify, inter alia, a client-requested file or directory. In FIG. 6, the client-requested file or directory is represented by an inode number 62, a starting offset 64 within the requested the file or directory, and a length of data 66 to retrieve (or write) following the starting offset 64.

The file system 31 uses the inode number 62, offset 64 and length 66 to determine file block numbers (FBNs) 68. In other embodiments, the file block numbers may be directly provided in the client request or in the file-system message such that the file system 31 does not have to convert the inode number 62, offset 64, length 66 into FBNs 68.

Having determined the FBNs 68, the file system then maps the FBNs 68 to a list of VBNs 70, which maps to actual on-disk data blocks. The list of VBNs is coalesced into chains of VBNs 72, as described in more detail below. Each chain is then issued to the storage access layer 34.

The storage access layer 34 receives the chains from the file system 31 and maps each VBNs in a chain to disk block numbers (DBN) 76. Storage access layer 34 then sends the DBNs to an appropriate driver (e.g. SCSI) in the storage driver(s) layer 35. The storage driver(s) layer 35 accesses the requested DBNs from the storage devices 4 and loads (or retrieves) the actual on-disk requested data block(s) in memory for processing by the file system 31.

Figure 7A:
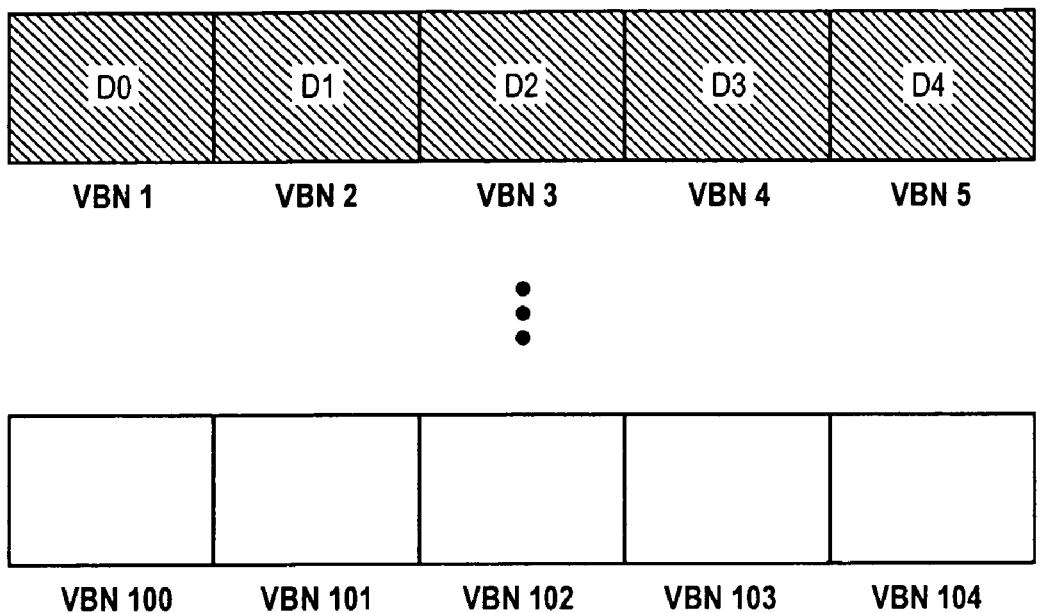
FIGS. 7A and 7B show various arrangements of on-disk data blocks in relation to volume block numbers (VBNs)
Figure 7B:
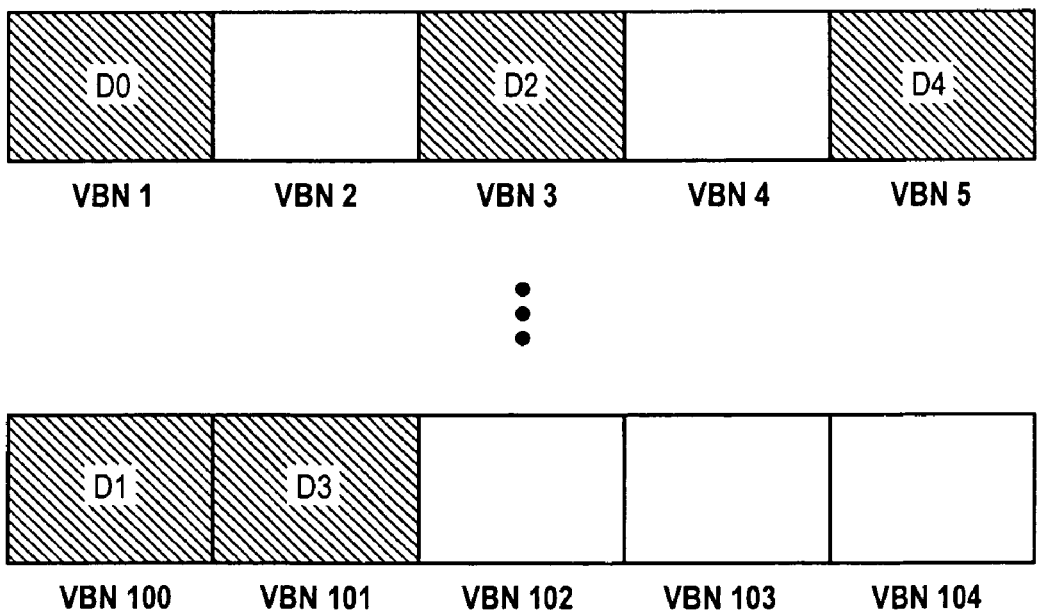

FIGS. 7A and 7B show various arrangements of actual data blocks in relation to volume block numbers (VBNs). In FIG. 7A, on-disk data blocks D0-D4 are arranged such that the corresponding volume block numbers (VBNs) are sequential (i.e. VBN 1-5). This arrangement may occur, as previously noted, when the file is initially written to the storage device (s), for example. These volume block numbers (e.g. VBN 1-5) may point to different physical storage devices.

In FIG. 7A, volume block numbers (VBNs) 100-104 are not associated with actual data. Volume block numbers 100-104 may not have been previously associated with actual data if VBN 100-104 references a new storage device, for example. However, in a real storage server, the number of blocks is limited and the storage server will use (or reuse) blocks it used previously but freed as modified data was written to a different block. Therefore, VBNs 100-104 may have been previously associated with data and later disassociated when a file or data was marked for deletion, for example. Therefore, in FIG. 7A, volume block numbers 100-104, though shown as empty, may map to a DBN address containing actual, but over-writeable, data.

In FIG. 7B, actual data blocks D0-D4 are arranged such that the corresponding volume block numbers are non-sequential. Specifically, data blocks D0-D4 are now associated with VBN 1, 100, 3, 101 and 5, respectively. This arrangement may have resulted from a variety of circumstances. For example, the corresponding file may have been modified in a write-anywhere system (e.g. WAFL®), such that the modified data blocks were written to VBN 100 and 101. Additionally, the fragmentation may have resulted from random overwrites. Additionally, a storage server may have received multiple overlapping client requests such that VBN sets are interleaved. In such a scenario (which may occur in a block-level deployment, for example), the interleaved sets of VBNs in the client request (and therefore file-system message) may or may not be associated with the same file.

Figure 8:
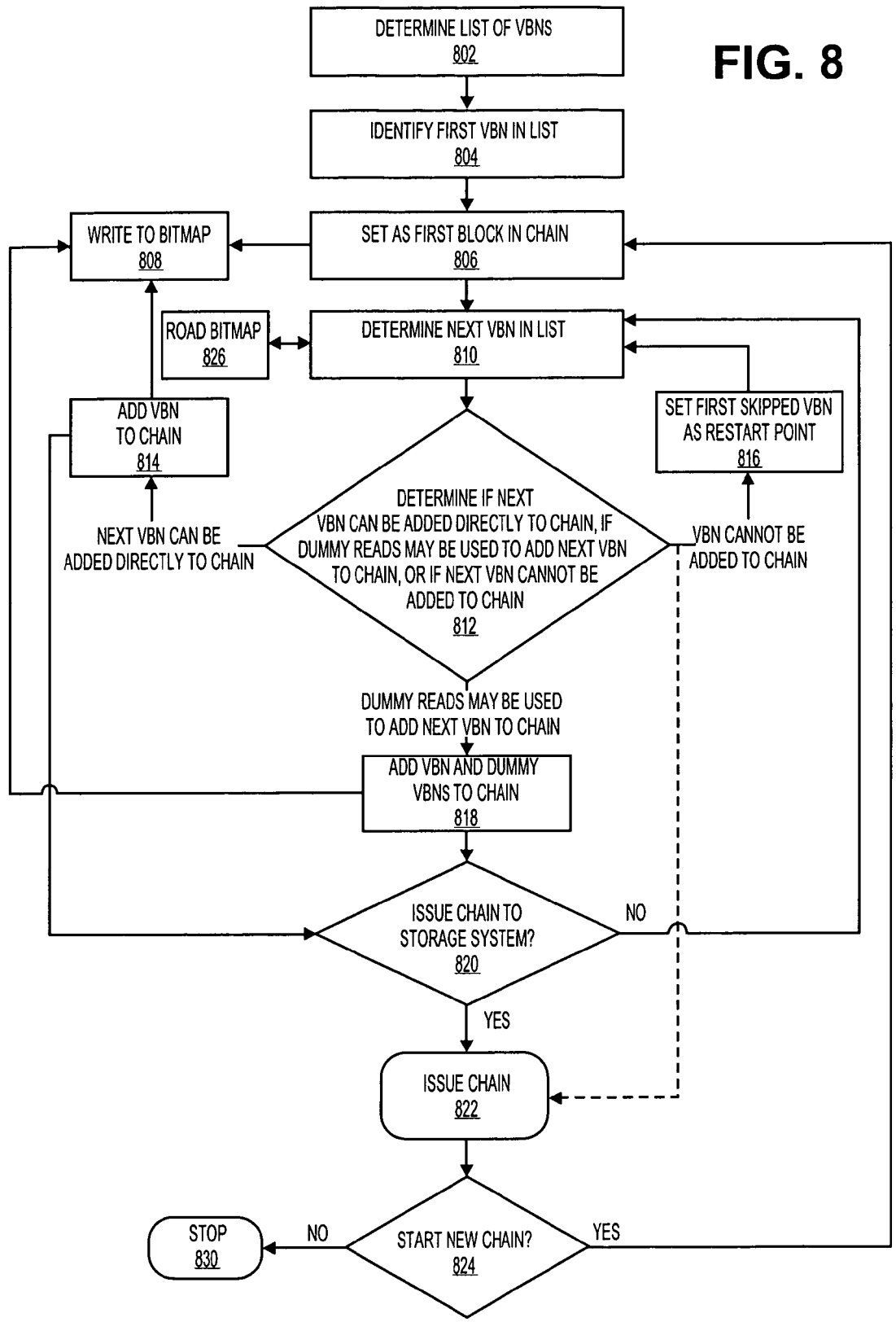
FIG. 8 shows a flow diagram of one technique to read multiple data blocks in accordance with one embodiment of this invention.

Presented with a list of non-sequential VBNs, embodiments of this invention optimize the multi-block read operation by coalescing the list into chains of VBNs that are issued asynchronously to the storage subsystem for data retrieval. FIG. 8 shows a flow diagram of one technique to read multiple data blocks in accordance with one embodiment of this invention.

The diagram starts at 802 where the file system determines a list of non-sequential of volume block numbers (VBNs). In an embodiment where the file system is part of a file server, this determination may occur as a result of mapping a client requested file's FBNs to VBNs, for example. In other embodiments, the file system may receive a request which includes the list of VBNs, e.g. in a block-based deployment environment. In such an embodiment, the file system may extract the list of VBNs from the request without having to map the VBNs from FBNs.

At 804, the file system identifies the first VBN in the list. For example, if the list is VBN 1, 2, 100, 101, 6, 7, 200, the file system identifies VBN 1. At 806, this first VBN is set as the first VBN in a chain. The chain may be implemented in a variety of data structures, including but not limited to a link list or hash. This data structure may be stored in memory 22, for example.

At 808, the file system writes to a bitmap to indicate the addition of VBN 1 to a chain. This bitmap may also be stored in memory 22, for example. The bitmap tracks volume block numbers (VBNs) added to chains. The bitmap may be used to determine which VBN in the list to ignore on a subsequent scan of the list and to prevent the file system from re-issuing reads of the same VBNs to the storage subsystem (e.g. RAID/disk). In other embodiments, other tracking techniques (e.g. techniques using arrays) may track VBNs added to chains.

In the embodiment shown in FIG. 8, VBNs are written to the bitmap as the VBNs are added to a chain. That is, when a VBN is added to a chain, a corresponding bitmap entry is set. Therefore, the bitmap will include one entry for each VBN being read. When each of these entries is a single bit, the bitmap may be sufficiently compact to be stack-allocatable, even when hundreds of VBNs are in the list. The compactness of the bitmap additionally allows for minimal impact on a processor cache (e.g. a central processing unit (CPU) level 1 (L1) cache), thereby improving performance. As previously noted, if the list is re-scanned/searched, the storage server may use the bitmap to determine which VBN in the list to ignore on the re-scan.

At 810, the next VBN in the list (e.g. VBN 2) is identified. At 812, a determination is made on whether the VBN can be directly added to the chain, whether one or more dummy reads may be used to add the VBN to the chain, or whether the VBN cannot be added to the chain. As used herein, a dummy read refers to an operation in which a data from a block which may be referred to as a "dummy block") is read and ignored/discarded. For example, in certain embodiments, data may be discarded after retrieval from the storage subsystem without being transmitted to the file system. In other embodiments, the data may be received by the file system and ignored, as will be described in more detail below. In this example, the next VBN is VBN 2, which can be added directly to the chain after VBN 1. Therefore, at 814, VBN 2 is added the chain (e.g. added to the link list or hash). The file system then sets the bitmap (e.g. writes a bit to the bitmap) at 808 indicating that VBN 2 has been added to a chain.

However, if the next VBN in the list was VBN 100, the determination at 812 would indicate that VBN 100 could not be added to the chain of VBN 1, 2. In certain embodiments, this determination may have included determining that VBN 100 was not within a dummy read span of the chain. The dummy read span may be determined by an absolute value (e.g. within five VBN numbers), in certain embodiments. In other embodiments, the dummy read span may be determined using another criterion, such as a relative value.

At 816, a restart point is set to the first VBN not added to the chain, in this case, VBN 100. By setting a restart point, certain VBNs will not have to be examined in a subsequent re-scan of the list. For example, in this case, VBN 1 and 2 would not be reexamined in a re-scan. In one embodiment, this restart point is indicated using a bitmap (e.g. by setting a bit in bitmap 808) or a similar data structure. In other embodiments, this restart point is not set but rather determined when needed by examining the bitmap at 808 (e.g. by identifying the last VBN added in the bitmap and starting at the VBN following that last VBN).

After skipping VBN 100 (and in certain embodiments setting VBN as a restart point) the process may return to 810 to determine that the next VBN in the list is VBN 101. At 812, the determination would indicate that VBN 101 should not be added to the chain of VBN 1, 2. In embodiments in which restart points are set, because the restart point is already set (for VBN 100), the restart point will not be reset (for VBN 101). Instead, in those embodiments, the process returns to 810 to determine the next VBN in the list, in this case, VBN 6.

In certain embodiments, VBN 6 may be within the dummy read span. In those embodiments, VBN 6, and any intermediate dummy VBNs, are added to the chain at 818. For example, dummy VBN 4, dummy VBN 5, and VBN 6, is added to the chain at 818. When a file system reads a VBN as a dummy block, the data retrieved from that VBN will be discarded rather than returned to the storage server. In other embodiments, the data read from the dummy block may be returned to the storage server, but the storage server will discard and/or ignore that data. The bitmap at 808 is then set to indicate that VBN 6 was added to the chain.

In certain embodiments, each time a VBN is added to a chain, a determination at 820 is made whether to issue the chain. For example, in FIG. 8, this determination may be made after a VBN is added to the chain at 814 or 818.

A variety of predetermined criteria, alone or in combination, may be used at 820 to determine if a chain should issue, including but not limited to reaching an end of the list, reaching a predetermined maximum length of a chain, or determining that a discontinuity in the list exceeds a threshold size. For example, one criterion may be whether all the VBNs in the list have been added to the bitmap. If not, the chain may not issue at 820, and the next VBN in the list may be determined at 810. Additionally or alternatively, the criterion may be a predetermined maximum chain length. For example, a chain may issue if the chain is 32 volume block numbers long, regardless of whether additional VBNs may be added to the chain. Additionally or alternatively, the criteria may be a predetermined threshold discontinuity size. For example, if the chain includes a certain number or percentage of dummy blocks, the file system may determine that a discontinuity in the list of volume block numbers (i.e., break between sequential VBNs in the list) exceeds a threshold value. The file system may then issue the chain to the storage subsystem at 822. Additionally or alternatively, the predetermined criteria may be the end of the VBN list.

If a determination is made at 820 that the chain should issue at 822, the chain may be issued asynchronously. For example, the file system may initiate a routine to issue the chain and then continue the process (e.g. at 824) without waiting for completion of the routine.

If a determination is made at 820 that the chain should not issue at 822 (e.g. because the chain is under a threshold size and the end of the VBN list has not been reached), the file system returns to 810 to determine the next VBN in the list. In this example, the file system returns to 810 to determine the next VBN in the list is VBN 7. VBN 7 is sequential to VBN 6, and therefore added to the chain at 814. The bitmap is set at 808 accordingly.

The process returns to 820 and a decision may be made to issue the chain to the storage subsystem. In certain embodiments, the chain may not issue until after the VBN 200 is examined. Since VBN 200 is the last VBN in the chain, in certain embodiments, the process may proceed directly to 820 to issue the chain (as shown by the dotted line in FIG. 8).

After a chain issues at 822, a decision is made at 824 whether to start a new chain. In certain embodiments, the decision to start a new chain may be made by examining the restart point. If the restart point is set to a VBN number, the file system may start a new chain at 806 using that VBN number. The restart point may be cleared before, after or simultaneously with starting the new chain. In other embodiments, the restart point may not be cleared. Instead, when a VBN that cannot be added to the new chain is later encountered in the list, the restart point may be set to that VBN.

In certain embodiments, regardless of whether the restart point is set, the file system may decide against starting a new chain after considering one or more predetermined criterion, which may include, but is not limited to, reaching a threshold number of sequences, determining that a number of blocks to be read exceeds a threshold number, or determining that a percentage of discontinuities in two chains exceeds a threshold percentage. For example, the file system may determine that more than a threshold number of VBNs must be searched (e.g. when the list is 512 VBNs long). Searching through a list of such a length may be undesirable because of the length of time needed or the amount of resources used, for example.

The file system may also decide against starting a new chain if the number of dummy reads or breaks in one chain is larger than a threshold number. The file system may instead switch to another read technique because such a chain may indicate that the list is highly fragmented and that coalescing may be inefficient. For example, if a first chain of VBN 1-50 includes more than 50% (consecutive or non-consecutive) dummy reads, the file system may decide against starting a new chain, and instead begin to issue reads for the list as nonsequential VBNs are encountered (i.e. without attempting to coalesce the VBNs).

In other embodiments, the file system may switch to another read technique after a certain number of chains have a threshold number of dummy reads. For example, if a first chain of VBN 1-50 includes more than 50% dummy reads, the file system may issue the first chain and start a second chain. If the second chain also has more than 50% dummy reads, then the file system may revert to another read technique. Therefore, the file system may not switch to another read technique until a certain number of chains have a threshold number of dummy reads. The certain number of chains may be any predetermined number, such as two in the example above.

In certain embodiments, chains having a threshold number of dummy reads may be interspersed with chains having an acceptable number of dummy reads. For example, a first chain may have 55% breaks, a second chain 5% breaks, and a third chain 70% breaks. In certain embodiments, the file system switches to another read technique after the third chain because two chains (e.g. the first chain and third chain) have >50% breaks, even though the first and third chain are separated by a chain with <50% breaks (i.e. the second chain).

The file system may also decide against starting a new chain if the number of chains created exceeds a certain threshold number. This threshold number may indicate that the list of non-sequential VBNs is highly fragmented and that coalescing may be inefficient. For example, the file system may have created 100 separate chains, each having a small number of VBNs. This number of separate chains (100) may indicate that the list's fragmentation is sufficiently high to make coalescing inefficient.

Finally, as previously noted, the file system may decide against starting a new chain if every volume block number in the list has been included in a chain. The file system may compare the bitmap or array against the VBNs list, for example, and determine that the bitmap contains every VBN in the list. The coalescing process is therefore complete and the process ends at 830.

If the file system decides to start a new chain, the block set as the restart point may be set as the first block in the new chain at 806. In the above example, the restart point is set to VBN 100. Therefore, VBN 100 may be set as the first block in the new chain. At 810, the next VBN is determined, in this case VBN 101. VBN 101 is added to the chain at 814 and the bitmap set accordingly. Therefore, by using the restart point, VBN 1-2 are not re-examined.

The process may continue and eventually return to 810 to determine the next VBN in the list. In certain embodiments, determining the next VBN in the list may include reading the bitmap at 826. In this example, reading the bitmap at 826 indicates that VBN 6 and 7 were previously added to a chain sent to the storage subsystem. Therefore, VBN 6 and 7 is skipped, i.e. neither VBN 6 nor 7 is examined at 812, and therefore, neither can be added again to a chain. This prevents VBNs from being redundantly read from the storage subsystem.

Instead, VBN 200 would be examined at 812. In certain embodiments, VBN 200 may be determined to be outside a dummy read span of a chain ending at VBN 101. Therefore, VBN 200 would not be added to the chain. In certain embodiments, the process may continue directly to 822 to issue the chain (as previously noted). Because VBN 200 is the last VBN in the list, in certain embodiments, the file system may also issue VBN 200 as a chain of one VBN at 812. These two chains may be issued synchronously or asynchronously.

In other embodiments, the chain of VBN 100-101 may issue at 822, but the process may repeat, starting a new chain at VBN 200. In embodiments in which the restart point was cleared, VBN 200 would be set as the new restart point at 816. In other embodiments in which the restart point was not cleared, the restart point may be advanced to the new point at VBN 200. The bitmap may be set at 808 to add VBN 200. At 810, a determination may be made that no additional VBNs remain in the list. Therefore, the chain of VBN 200 issues at 822 and the process then terminates at 830.

Figure 9:
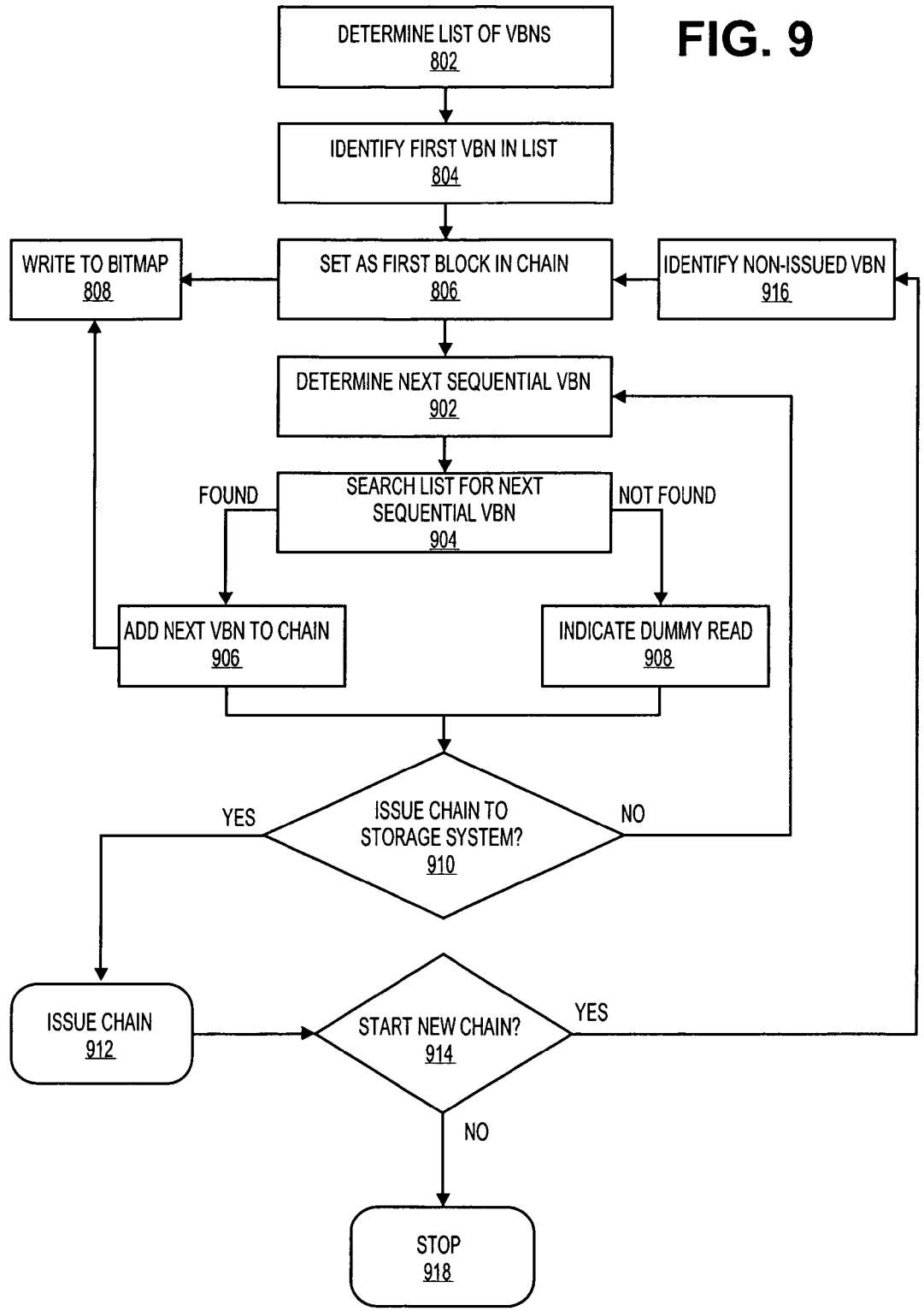
FIG. 9 shows a flow diagram of another technique to read multiple data blocks in accordance with one embodiment of this invention.

FIG. 9 shows a flow diagram of another technique to read multiple data blocks in accordance with another embodiment of this invention. In FIG. 9, the storage server searches for the next VBN to add to the chain rather than examines the next VBN in the list. As in FIG. 8, in FIG. 9, a file system determines a list of non-sequential VBNs at 802, identifies the first VBN in the list at 804 and sets that VBN as the first VBN in a chain at 806.

At 902, the next sequential VBN is determined. In the example above, the next VBN after VBN 1 is VBN 2. At 904, the storage server searches the list for the next VBN (i.e. VBN 2). If the next VBN is found in the list, then at 906 the next VBN is added the chain (e.g. added to the link list or hash). Applying this process to the block arrangement of FIG. 7A, for example, the file system searches the list (VBN 1, 2, 3, 4, 5) for VBN 2, finds VBN 2, and adds VBN 2 to the chain which began with VBN 1. The file system then writes to the bitmap at 808 indicating that VBN 2 has been added to a chain. Other embodiments may write to the bitmap at a different point in the process, e.g. after the file system issues the chain to the storage subsystem.

If the next VBN is not found in the list, on the other hand, the file system indicates at 908 that a dummy read will be performed. For example, when applying this process to the block arrangement of FIG. 7B, the file system searches the list (VBN 1, 100, 3, 101, 5) for VBN 2 and fails to find VBN 2. The file system notes that VBN 2 may be read as a dummy block. In certain embodiments, the file system may write to the bitmap in 808, or another bitmap or an array, to indicate that VBN 2 is a dummy block.

Although VBN 2 is marked for a dummy read while the chain is being formed, VBN 2 may not actually be read (even in a dummy read) depending on whether the file system decides to issue the chain at 910. If the chain issues to the storage subsystem at 910, issuing a message to read VBN 1-2 with VBN 2 as a dummy read may be an unnecessary use of resources. However, if the file system decides not to issue the chain at 910 and instead searches and finds the next sequential VBN (e.g. VBN 3) in the list, then reading VBN 2 as a dummy block is desirable because the file system can issue one message (e.g. read VBN 1-3), rather than two messages (e.g. read VBN 1 and read VBN 3). Accordingly, a file system may remove the last VBN from a chain before issuing the chain if the last VBN will be read as a dummy block.

Again, a variety of predetermined criteria, alone or in combination, may be used to determine if a chain should issue to the storage subsystem, including but not limited to reaching an end of the list, reaching a predetermined maximum length of a chain, or determining that a discontinuity in the list exceeds a threshold size. For example, as previously stated, the criteria may be a threshold discontinuity size. In the embodiment shown in FIG. 9, if the file system unsuccessfully searches for several sequential VBNs, such that a certain number of dummy reads must be performed, the file system may determine that the discontinuity exceeds a threshold value and issue the chain to the storage subsystem at 912. For example, where the list is VBN 1, 100, 3, 101, 5, the file system will not find another VBN in the list after VBN 5 until the file system searches for VBN 100. After a certain threshold number of unsuccessful searches, such as 10 (or a failure to find VBN 15), the file system may issue the chain at 912. Additionally, the other predetermined criteria noted above and with reference to FIG. 8, alone or in combination, may also be used to determine if a chain should issue to the storage subsystem In the embodiment shown in FIG. 9, after the file system issues a chain at 912, a decision is made at 914 on whether to start a new chain. Again, the decision on whether to start a new chain may be made based on the criteria described above with regard to FIG. 8, e.g. after considering one or more predetermined criterion, which may include, but is not limited to, reaching a threshold number of sequences, determining that a number of blocks to be read exceeds a threshold number, or determining that a percentage of discontinuities in two chains exceeds a threshold percentage.

If a new chain is started in 914, the system may identify at 916 a non-issued VBN in the list. For example, if the criteria to determine whether to start a new chain at 914 includes determining the length of the list (e.g. VBNs 1, 100, 3, 101, 5) and the length of the list is less than a threshold number (e.g. 5<threshold number), the file system may decide to start a new chain in 914. The file system may then identify at 916 the first non-issued VBN in the list (e.g. VBN 100).

In certain embodiments, the first non-issued VBNs in the list is determined when the decision to start a new chain is made at 914. For example, the file system may examine the bitmap (or array) to determine if every VBN in the list has been added to a chain (and/or issued to the storage subsystem). When the file system encounters a VBN that has not been added to a chain (i.e. a non-issued VBN), the file system may decide to start a new chain and pass this VBN directly to 806. This VBN is then set as the first block in the new chain, thereby bypassing the separate identification at 916. If a new chain is not started, the process terminates at 918.

Figure 10:
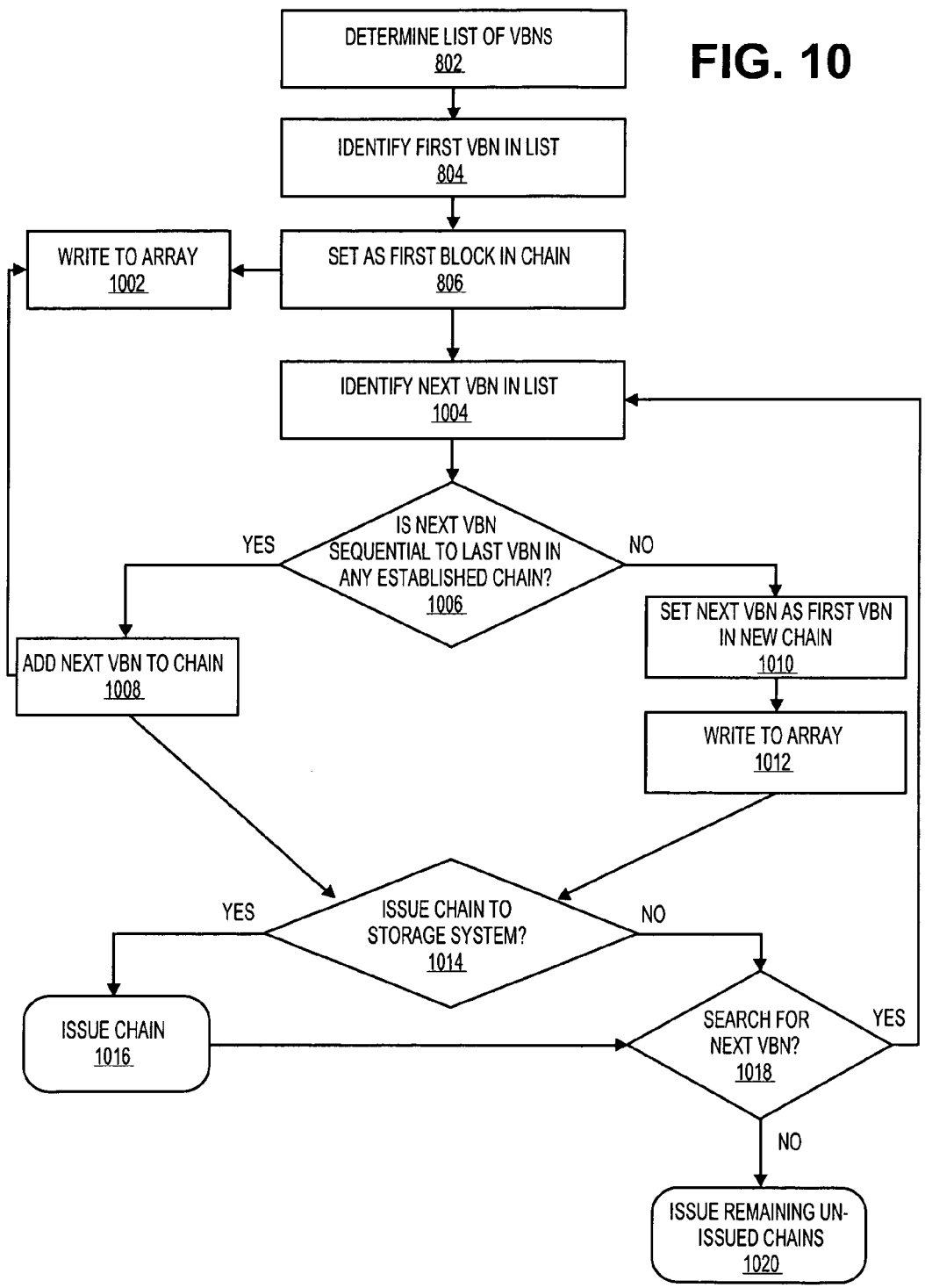
FIG. 10 shows a flow diagram of another technique to read multiple data blocks in accordance with one embodiment of this invention.

FIG. 10 shows a flow diagram of another technique to read multiple data blocks in accordance with another embodiment of this invention. In FIG. 10, the storage server creates multiple chains simultaneously. As in FIG. 9, in FIG. 10, a file system determines a list of non-sequential VBNs at 802, identifies the first VBN in the list at 804 and sets that VBN as the first VBN in a chain at 806. At 1002, the file system writes to an array to indicate that the first VBN (e.g. VBN 1) is part of a chain. At 1004, the next VBN in the list (e.g. VBN 2 or VBN 100) is identified.

At 1006, the file system determines if the next VBN is sequential to the last VBN added to any established chain. Applying FIG. 7A to this process, for example, the next VBN is VBN 2, which is sequential to the last VBN in an established chain (i.e. VBN 1). Therefore, in FIG. 10, VBN 2 is added to the chain at 1008 and written to the array at 1002. Applying FIG. 7B to this process, as another example, the VBN after VBN 1 in the list is VBN 100, which is not sequential to the last VBN in any established chain. Therefore, in FIG. 10, at 1010, VBN 100 is set as the first VBN in a new chain and written to an array at 1012. The array may be the same array as in 1002 or may be a different array. Additionally, either the array at 1002 or 1012 may be a bitmap or other tracking mechanism.

In certain embodiments, the next VBN may not be sequential to a VBN in an established chain, but may be within a certain threshold value. For example, the next VBN may be VBN 3, rather than VBN 2, and the established chains may be a chain having VBN 1 thus far and a chain having VBN 100 thus far. The file system may determine that VBN 3 is within a certain threshold range from a volume block number in an established chain (e.g. VBN 1). Because VBN 3 is within the threshold range, the file system may include VBN 2 in the chain, mark VBN 2 for a dummy read, and add VBN 3 to the chain. The chain therefore may be VBN 1-3, even though data read from VBN 2 may be discarded or ignored in a dummy read.

At 1014, the file system decides whether to issue the chain under examination (e.g. the chain from 1008 or the chain from 1010) at 1016. The criteria used to decide whether to issue the chain under examination may be the same predetermined criteria used in FIG. 8 at 820, including but not limited to reaching an end of the list, reaching a predetermined maximum length of a chain, or determining that a discontinuity in the list exceeds a threshold size. For example, the criteria may be reaching the end of the VBNs list. Since in the embodiment of FIG. 10, VBNs in the list are added to chains as the list is traversed, reaching the end of list indicates that the coalescing process is complete and therefore, any un-issued chains (including those not under examination) should be issued. Therefore, if the file system determines at 1014 that the end of the VBNs list is reached, then the file system may issue all remaining un-issued chains to the storage access layer 34, synchronously or asynchronously.

The file system may issue the chains synchronously, for example, by initiating a routine to issue a chain. The file system may then wait for the routine to complete (e.g. by returning data) before issuing another chain. Therefore, the issuance of each chain may depend on the complete issuance of other chains.

Alternatively, the file system may issue the chains asynchronously by initiating a routine for each chain independent of the completion of other issuances. For example, the file system may call a routine multiple times to issuance multiple chains. A routine may be initiated with a certain value (e.g. a range of VBNs), for example. Once initiated, the routine may be initiated again with a different value (e.g. a different range of VBNs), without waiting for the first routine to return. Accordingly, multiple independent threads may process multiple read commands simultaneously.

If the file system decides at 1014 to issue a chain for a reason other than reaching the end of the VBNs list, the file system may proceed to 1018 and determine whether to search for the next VBN in the list of non-sequential VBNs. For example, if the file system decides at 1014 to issue a chain because the chain has reached a threshold length (e.g. 32 volume block numbers), then the file system has yet to determine if the end of the list has been reached. Therefore, the file system may determine at 1018 if the end of the list has been reached and issue any remaining un-issued chains at 1020.

However, even if the end of the list has not been reached, the file system may still determine at 1018 not to search for the next VBN in the list of non-sequential VBNs, e.g. after considering one or more predetermined criterion, which may include, but is not limited to, reaching a threshold number of sequences, determining that a number of blocks to be read exceeds a threshold number, or determining that a percentage of discontinuities in two chains exceeds a threshold percentage. The file system may determine, for example, that the number of established chains has reached a threshold value, which may indicate that the list is highly fragmented. The file system may then switch to another read technique and issue all un-issued chains.

In certain embodiments, before deciding whether to search for the next VBN, the file system may also examine the "age" of established chains. For example, the file system may track (e.g. in the bitmap) when a chain was last modified. If the number of loops or the length of time since the last modification exceeds a threshold value, the file system may issue the chain to the storage subsystem. For example, if the list is VBN 1, 100, 3, 1000, 5, 700, 701, 702, 703 . . . 750, the file system may determine after reading VBN 720 that the first chain (beginning with VBN 1) has not been modified for N loops. The file system may then issue the chain (e.g. read VBN 1-5) rather than wait to find VBN 6 or VBN 7. The file system may then determine whether to search for the next VBN at 1018.

EXAMPLES

FIG. 11 shows a table of various chains that may be created and messages that may be issued (asynchronously or synchronously) for sample VBNs lists. For illustrative purposes, the lists shown in FIG. 11 have relatively short lengths. However, it shall be appreciated that the VBNs lists received by a storage server may be significantly longer.

Row A shows a list of sequential VBNs. This list may be the result of a readahead operation, for example. Therefore, a list of potentially non-sequential VBNs may be received in the file system that is actually sequentially. In certain embodiments of this invention, this list is handled in the manner described by FIG. 8, 9 or 10. The result of the process may be one chain created and issued. For example, one chain (1-5) may be created and one message (read 1-5) may be issued to the storage subsystem. In other embodiments, more than one chain may be created and issued, e.g. when a single chain would exceed a threshold chain length. In other embodiments, the received list of sequential VBNs may be detected and issued directly to storage subsystem, bypassing the process of FIG. 8, 9 or 10.

Row B shows a list having interleaved sets of VBNs. In Row B, chains 1-6 and 100-103 may be formed from the list 1, 100, 3, 102, 5, 103 and 6. Dummy reads fill in certain gaps in the list (e.g. the gaps between VBN 1 and 3 and 5). Chain 1-6 may be issued to the storage subsystem for retrieval from storage disks before, after or simultaneously with an issuance of chain 100-103. Row C shows a list having multiple interleaved sets of VBNs.

Row D shows a list having a single set of VBNs with random fragmentation: 1, 100, 3, 1000, 5 and 700. Although four chains are created (and thereby four messages sent to the storage subsystem), the storage server still benefits from coalescing since VBNs 1, 3 and 5 may be coalesced into one read message (i.e. read vpn 1-5), thereby reducing the number of messages sent to the storage subsystem by two. With a longer list of VBNs, the reduction in read overhead may be greater.

Row E shows a list of VBNs in which a first chain (e.g. 1-5) may be issued before a second chain (e.g. 700-709) due to aging. For example, if a certain VBN is not found in the list after several scans (e.g. to extend a chain), the chain may issue to the storage subsystem. For example, if VBN 6 is not found after ten scans, chain 1-5 may issue while chain 700-709 continues to build.

Thus, a method and apparatus for reading multiple data blocks have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. Furthermore, the use of the phrase "one embodiment" throughout does not necessarily mean the same embodiment.

As used herein, the term "operating system" generally refers to the computer-executable code operable on a computer that manages data access and may, in the case of a multiprotocol storage appliance, implement data access semantics. The operating system can be implemented as a microkernel, like the Data ONTAP™ operating system available from Network Appliance, Inc., Sunnyvale, Calif. The storage operating system can also be implemented as an application program operating over a general-purpose operating system, such as UNIX® or Windows NT®, or as a general-purpose operating system with configurable functionality, which is configured for storage applications as described herein. It is expressly contemplated that any appropriate storage operating system may be enhanced for use in accordance with the inventive principles described herein.

A file, as used herein, may be embodied as a "virtual disk" (vdisk) that corresponds to a predefined set of data blocks that can be exported to block-based clients as a single logical unit number (LUN), even though the data blocks in the virtual disk are accessed using file-based semantics. In this manner, the block-based clients can format their requests in accordance with a conventional block-based protocol, such as the FCP or iSCSI protocol, whereas the requests are processed by a virtualization system implemented by the storage operating system using file-based semantics.

The principles are equally pertinent to all types of computers, including those configured for block-based storage systems (such as storage area networks), file-based storage systems (such as network attached storage systems), combinations of both types of storage systems (such as multiprotocol storage appliances), and other forms of computer systems.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

What is claimed is:

1. A method for reading multiple data blocks comprising:
   coalescing volume block numbers in a list of non-sequential volume block numbers into one or more chains of sequential volume block numbers, wherein the coalescing includes scanning the list of non-sequential volume block numbers until a termination condition is satisfied, and wherein the termination condition is one from the group consisting of: reaching a threshold number of sequences, determining that a number of non-sequential volume block numbers exceeds a threshold number, and determining that a percentage of discontinuities in two chains exceeds a threshold percentage; and
   transmitting each chain asynchronously to a mass storage subsystem for processing.

2. The method of claim 1, wherein the non-sequential volume block numbers identify locations of the multiple data blocks in an array of storage devices in the mass storage subsystem.

3. The method of claim 1, wherein the coalescing includes detecting a discontinuity in the list of volume block numbers and using a dummy read to search the list after the discontinuity for a specific volume block number, said dummy read characterized in that a data block read by said dummy read is ignored or discarded after being read.

4. The method of claim 1, further comprising writing a bit to a bitmap for each volume block number transmitted to the mass storage subsystem.

5. The method of claim 1, wherein the mass storage subsystem is a disk storage subsystem implementing a RAID protocol.

6. A method comprising:
   receiving a request to read multiple data blocks from a storage facility which includes a plurality of mass storage devices, wherein the request specifies a set of blocks corresponding to a list of non-sequential volume blocks numbers locating the multiple data blocks in the storage facility;
   scanning the list to extract a plurality of sequences of volume block numbers;
   dispatching asynchronously to the storage facility each sequence as a first predetermined criterion is satisfied for each sequence, wherein the first predetermined criterion is one from the group consisting of: reaching an end of the list, reaching a predetermined maximum length of a chain, and determining that a discontinuity in the list exceeds a threshold size; and
   terminating the scanning when a second predetermined criterion is satisfied.

7. The method of claim 6, wherein the scanning is performed by a file system layer in a storage server.

8. The method of claim 6, wherein the second predetermined criterion is selected from the group consisting of: reaching a threshold number of sequences, determining that a number of blocks to be read exceeds a threshold number, and determining that a percentage of discontinuities in two chains exceeds a threshold percentage.

9. The method of claim 6, further comprising modifying a bitmap to indicate each volume block number extracted into a sequence.

10. The method of claim 6, wherein the data blocks are striped across the plurality of mass storage devices.

11. A system comprising:
    a storage server;

a file system to maintain a hierarchical structure of data stored in an array of storage devices of the storage server and to service read and write requests from one or more clients relating to data stored in the array of storage devices;

a coalescing module to analyze a multi-block read request received by the file system, the read request corresponding to a set of non-sequential logical data blocks, and to coalesce logical blocks from said set to create one or more sequences of read requests from the read request, each said sequence specifying a set of sequential logical data blocks, wherein the multi-block read request includes a list of volume block numbers to be read and the coalescing module is further to indicate that the file system is to service the multi-block read request differently when a total number of volume block numbers in the list exceeds a threshold number or when a percentage of discontinuities in the list exceeds a threshold percentage; and a storage access module to control access to data stored in the array of storage devices in response to the file system, the storage access module further to receive the one or more sequences of read requests and to read data blocks identified in the one or more sequences.

12. A server comprising:

a network interface through which to communicate with one or more clients over a network;

a storage interface through which to communicate with an array of storage devices;

a processor; and a memory storing instructions which, when executed by the processor, cause the server to perform a set of operations, including searching for a first block in a list of non-sequential blocks to be read from the array of storage devices;

identifying the first block as a first block in a chain of blocks;

searching the list for a second block sequential to the first block, wherein searching for the second block includes using a dummy read when encountering a block non-sequential to the first block;

adding the second block to the chain of blocks; and transmitting the chain of blocks to the array of storage devices for processing when a predetermined criterion is satisfied, wherein the predetermined criterion is one from the group consisting of: reaching an end of the list, reaching a maximum length of a chain, and determining that a discontinuity in the list exceeds a threshold size.

13. The server in claim 12, wherein searching the list for the first block includes referencing a bitmap to determine if a block being analyzed was in another chain.

* * * * *